US012779818B2

(12) United States Patent
Hong et al.

(10) Patent No.: US 12,779,818 B2
(45) Date of Patent: Nov. 3, 2026

(54) LASER WELDING STRUCTURE FOR THERMOSETTING RESIN INCLUDING GLASS FIBER

(71) Applicant: COAVIS, Sejong-si (KR)

(72) Inventors: Yonghwa Hong, Sejong-si (KR); Hyunduck Jung, Gyeryong-si (KR)

(73) Assignee: COAVIS, Sejong-si (KR)

( * ) Notice: Subject to any disclaimer, the term of this patent is extended or adjusted under 35 U.S.C. 154(b) by 232 days.

(21) Appl. No.: 18/675,265

(22) Filed: May 28, 2024

(65) Prior Publication Data

US 2024/0399706 A1 Dec. 5, 2024

(30) Foreign Application Priority Data

May 31, 2023 (KR) ........................ 10-2023-0070106

(51) Int. Cl.

| | |
|---|---|
| ***B32B 7/05*** | (2019.01) |
| ***B32B 3/30*** | (2006.01) |
| ***B32B 27/08*** | (2006.01) |
| ***B32B 27/18*** | (2006.01) |
| ***B32B 27/28*** | (2006.01) |
| *B29C 65/16* | (2006.01) |
| *B29K 81/00* | (2006.01) |
| *B29K 105/08* | (2006.01) |
| *B29K 309/08* | (2006.01) |

(52) U.S. Cl.

CPC .................. *B32B 7/05* (2019.01); *B32B 3/30* (2013.01); *B32B 27/08* (2013.01); *B32B 27/18* (2013.01); *B32B 27/28* (2013.01); *B29C 65/1638* (2013.01); *B29K 2081/04* (2013.01); *B29K 2105/08* (2013.01); *B29K 2309/08* (2013.01); *B32B 2250/02* (2013.01); *B32B 2250/24* (2013.01); *B32B 2260/023* (2013.01); *B32B 2260/046* (2013.01); *B32B 2262/101* (2013.01); *B32B 2307/41* (2013.01); *B32B 2307/412* (2013.01); *B32B 2307/7376* (2023.05)

(58) Field of Classification Search

CPC .. B32B 7/05; B32B 3/30; B32B 27/08; B29C 65/1638; B29K 2309/08

See application file for complete search history.

(56) References Cited

U.S. PATENT DOCUMENTS

| | | | | |
|---|---|---|---|---|
| 2006/0283544 | A1* | 12/2006 | Mori | B29C 66/43 156/272.8 |
| 2019/0351623 | A1* | 11/2019 | Kihara | B32B 7/027 |

FOREIGN PATENT DOCUMENTS

| | | | |
|---|---|---|---|
| KR | 10-2016-0016348 | A | 2/2016 |

* cited by examiner

*Primary Examiner* — Joanna Pleszczynska

(74) *Attorney, Agent, or Firm* — DICKINSON WRIGHT PLLC

(57) ABSTRACT

Provided is a laser welding structure which may couple parts to each other by using a laser welding, and more particularly, a laser welding structure enabling laser welding of thermosetting resin including a glass fiber, the laser welding structure for the thermosetting resin including the glass fiber according to the present disclosure, and the method using the same, configured as described above, may provide the improved welding structure by coupling the parts made of the glass fiber-reinforced PPS material to each other by the laser welding.

7 Claims, 6 Drawing Sheets

LASER WELDING STRUCTURE FOR THERMOSETTING RESIN INCLUDING GLASS FIBER

CROSS-REFERENCE TO RELATED APPLICATIONS

This application claims priority under 35 U.S.C. § 119 to Korean Patent Application No. 10-2023-0070106, filed on May 31, 2023, in the Korean Intellectual Property Office, the disclosure of which is incorporated herein by reference in its entirety.

TECHNICAL FIELD

The following disclosure relates to a laser welding structure which may couple parts to each other by using laser welding, and more particularly, to a laser welding structure enabling laser welding of thermosetting resin including a glass fiber.

BACKGROUND

Polyphenylene sulfide (PPS), which is a type of thermosetting resin, is a new polymer material which may replace a metal in an automobile, an electrical or electronic product, and a machine due to its high strength and heat resistance to withstand temperatures up to 250 degrees Celsius. PPS is light in weight and relatively inexpensive, and is thus highly cost-competitive among super engineering plastics. Therefore, PPS has a gradually expanding range of uses, such as being used as a part material for precision equipment in a chemical plant, a semiconductor manufacturing process, or the like, a part material for an automobile pump, or a part material for reducing a weight of an electric vehicle or a hybrid vehicle.

In particular, glass fiber-reinforced PPS, which is a mixture of a glass fiber with PPS described above, has excellent rigidity and very high strength at a high temperature compared to unmodified PPS, and has excellent thermal and dimensional stability. Therefore, glass fiber-reinforced PPS may be suitable for a part exposed to a high load for a long time in a high temperature environment, such as a high pressure fluid pump.

Meanwhile, it is impossible to heat weld the thermosetting resin such as PPS when coupling parts to each other, and ultrasonic welding or laser welding may thus be considered. However, in the case of the glass fiber-reinforced PPS, the glass fiber included in its transmission surface may reflect a laser to thus interfere with laser transmission, which makes the laser welding impossible.

However, the ultrasonic welding may have a lower welding strength, poor airtightness, a burr occurring inside or outside a coupling surface of the parts caused by leakage of resin melted during the welding, and an amount of welding difficult to be adjusted. Accordingly, there is a need for the development of technology of coupling PPS parts including a glass fiber to each other by using the laser welding.

RELATED ART DOCUMENT

Patent Document

Korean Patent Laid-Open Publication No. 10-2016-0016348 (published on Feb. 15, 2016)

SUMMARY

An embodiment of the present disclosure is directed to providing a laser welding structure for thermosetting resin including a glass fiber that enables laser welding performed between parts each including a glass fiber-reinforced polyphenylene sulfide (PPS) material.

In one general aspect, provided is a laser welding structure which couples a transmission layer made of a laser beam transmission material and a non-transmission layer made of a non-transmission material to each other by laser welding, the structure including: the transmission layer made of a resin material including the glass fiber; and the non-transmission layer made of the resin material including the glass fiber and having one surface coupled to the other surface of the transmission layer, wherein the transmission layer through which a laser beam is transmitted has a thickness of 1.5 mm or less.

The non-transmission layer may include a weld mound protruding from the one surface to one side to be melted by the laser beam and welded to the other surface of the transmission layer.

When the transmission layer has a maximum thickness of more than 1.5 mm, the transmission layer may include a welding transmission layer protruding radially outward from a side, the welding transmission layer may have the other surface in contact with the one surface of the non-transmission layer, the laser beam may weld the transmission layer and the non-transmission layer to each other through the welding transmission layer, and the welding transmission layer through which the laser beam may be transmitted has a thickness of 1.5 mm or less.

The non-transmission layer may include a welding groove disposed outside the weld mound in a width direction and recessed from the one surface of the non-transmission layer to the other surface, and a welding layer protruding radially outward from the side, and in contact with one surface of the welding transmission layer, the weld mound and the welding groove may be formed at the welding layer, and the welding layer has a thickness greater than a depth of the welding groove.

The transmission layer through which the laser beam is transmitted may have a thickness of 0.5 mm or more.

When the transmission layer has a maximum thickness of more than 1.5 mm, the laser beam may be radiated to a welding surface, which is the one surface of the non-transmission layer, through a side of the transmission layer for the transmission layer through which the laser beam is transmitted to implement a thickness of 1.5 mm or less.

The transmission layer through which the laser beam is transmitted may have a thickness of 1.5 mm or less based on a laser beam diode wavelength of 900 to 1100 nm, the transmission layer may have a smaller thickness when the diode wavelength is larger than the wavelength of 900 to 1100 nm, and the transmission layer may have a greater thickness when the diode wavelength is smaller than the wavelength of 900 to 1100 nm.

In another general aspect, provided is a laser welding structure which couples a transmission layer made of a laser beam transmission material and a non-transmission layer made of a non-transmission material to each other by laser welding, the structure including: the transmission layer made of a resin material including the glass fiber; and the non-transmission layer made of the resin material including the glass fiber and having one surface coupled to the other surface of the transmission layer, wherein the transmission layer has a thickness enabling a transmittance of a laser beam transmitted through the transmission layer to be 20% or more.

The non-transmission layer may include a weld mound protruding from the one surface to one side to be melted by the laser beam and welded to the other surface of the transmission layer.

When the transmission layer has a thickness more than the thickness enabling the transmittance of the laser beam transmitted through the transmission layer to be 20% or more, the transmission layer may include a welding transmission layer protruding radially outward from a side, the welding transmission layer may have the other surface in contact with the one surface of the non-transmission layer, the laser beam may weld the transmission layer and the non-transmission layer to each other through the welding transmission layer, and the welding transmission layer may have the thickness enabling the laser beam transmittance of 20% or more.

The non-transmission layer may include a welding groove disposed outside the weld mound in a width direction and recessed from the one surface of the non-transmission layer to the other surface, and a welding layer protruding radially outward from the side, and in contact with one surface of the welding transmission layer, the weld mound and the welding groove may be formed at the welding layer, and the welding layer has a thickness greater than a depth of the welding groove.

When the transmission layer has a thickness more than the thickness enabling the laser beam transmittance of 20% or more, the laser beam may be radiated to a welding surface, which is the one surface of the non-transmission layer, through a side of the transmission layer for the transmittance of the laser beam transmitted through the transmission layer to be 20% or more.

Each of the transmission layer and the non-transmission layer may be made of polyphenylene sulfide (PPS), and have a glass fiber content of 30% or more.

The transmission layer may have an amount of welding by the laser beam of 0.05 mm to 0.2 mm.

Other features and aspects will be apparent from the following detailed description, the drawings, and the claims.

DETAILED DESCRIPTION OF EMBODIMENTS

Hereinafter, an embodiment of the present disclosure is described in detail with reference to the accompanying drawings.

First Embodiment (Basic Type)

Figure 1:
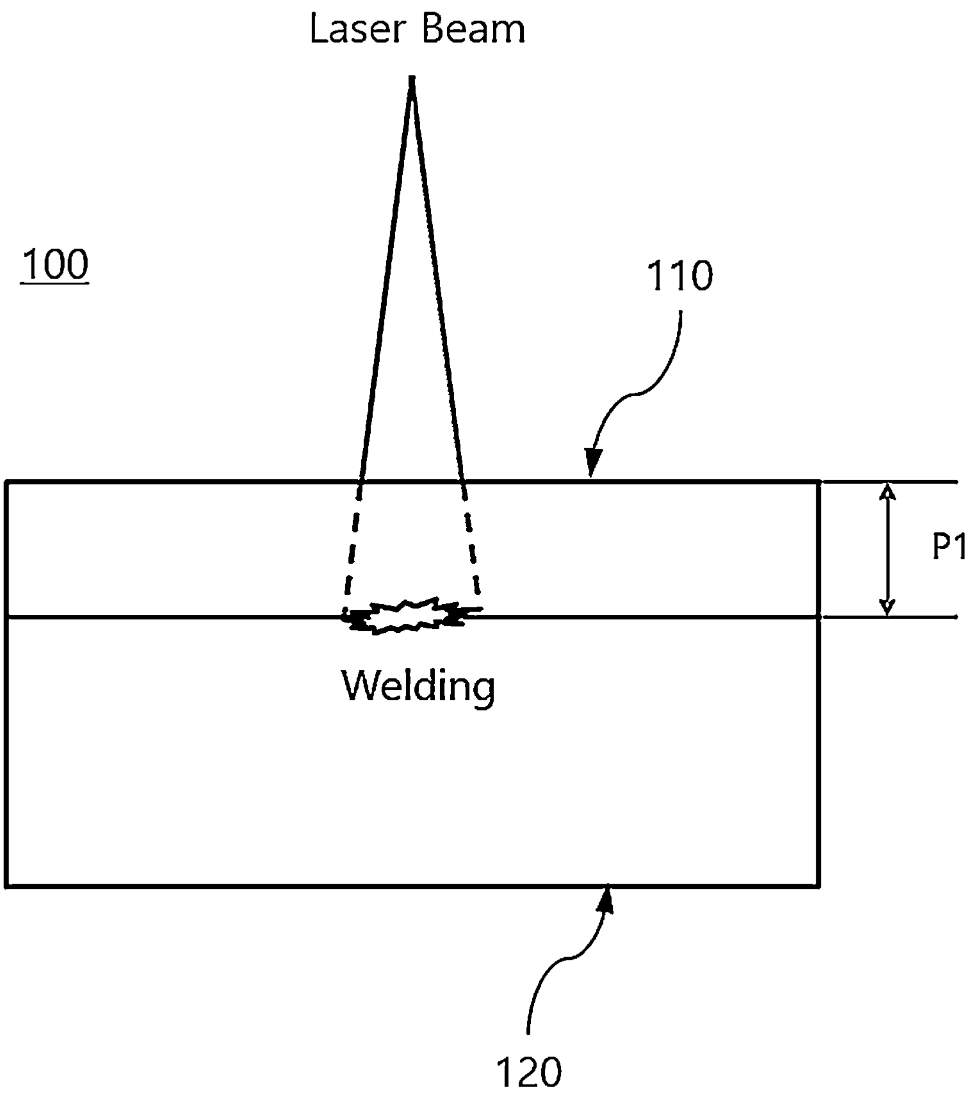
FIG. 1 is a schematic diagram of a laser welding structure according to a first embodiment of the present disclosure.

FIG. 1 is a schematic diagram of a laser welding structure 100 according to the first embodiment of the present disclosure. In addition, FIGS. 2A and 2B respectively show schematic diagrams of a laser welding part, which includes a transmission layer 110 and a non-transmission layer 120 before and after welding is performed thereon according to an embodiment of the present disclosure.

The laser welding structure 100 according to the first embodiment of the present disclosure may include the transmission layer 110 made of a polyphenylene sulfide (PPS) material including a glass fiber, and the non-transmission layer 120 made of the PPS material including the glass fiber. The PPS material including the glass fiber may be, for example, PPS GF-40 or GF-40 or higher. PPS GF-40 refers to PPS having a glass fiber content of 40%. In addition, the transmission layer 110 may have a color through which a laser beam is transmitted, and the non-transmission layer 120 may have a color through which no laser beam is transmitted. For example, the transmission layer 110 may have a white color, and the non-transmission layer 120 may have a black color.

Therefore, the transmission layer 110 may be stacked on one surface of the non-transmission layer 120, and the laser beam may then be radiated from one surface of the transmission layer 110. In this case, the laser beam may be transmitted through the transmission layer 110, and then melt one surface of the non-transmission layer 120, thus welding the other surface of the transmission layer 110 and one surface of the non-transmission layer 120 by means of their melted portions.

Here, laser welding is impossible because the glass fiber included in the transmission layer 110 may reflect the laser beam to thus lower a laser beam transmittance. However, the laser welding structure 100 in the present disclosure may use the following characteristic configuration to thus improve the laser beam transmittance, thereby enabling the laser welding.

Table 1 below shows a laser beam transmittance (%) based on a thickness (mm) of the transmission layer 110 in a direction through which the laser beam is transmitted and a content (%) of a glass fiber included in the PPS material when a laser diode wavelength is 980 nm, and Table 2 shows a laser beam transmittance (%) based on a thickness (mm) of the transmission layer 110 in the direction through which the laser beam is transmitted and a content (%) of a glass fiber included in the PPS material when a laser diode wavelength is 840 nm.

TABLE 1

| Laser wavelength of 980 nm | 1.5 mm | 0.8 mm | 0.4 mm |
|---|---|---|---|
| PPS GF40 (glass fiber 40%) | 12.7% | 22.5% | 28.0% |
| PPS GF30 (glass fiber 30%) | 20.3% | 28.3% | 32.0% |

TABLE 2

| Laser wavelength of 840 nm | 1.5 mm | 0.8 mm | 0.4 mm |
|---|---|---|---|
| PPS GF40 (glass fiber 40%) | 1.1% | 5.0% | 7.2% |
| PPS GF30 (glass fiber 30%) | 3.4% | 7.6% | 10.0% |

As shown in Tables 1 and 2 above, it may be seen that: the larger the laser diode wavelength, the higher the laser beam transmittance (%); the greater the glass fiber content of PPS, the lower the laser beam transmittance (%); and the greater thickness of the transmission layer, the lower the laser beam transmittance (%).

In addition, the PPS material may be required to have the laser beam transmittance of 20% or more to enable the laser welding performed thereon. When considering this requirement, the laser diode wavelength may need to be 980 nm or more because it is impossible for the PPS material to satisfy the required laser beam transmittance (%) in a case where the laser diode wavelength is 840 nm.

In addition, based on the laser diode wavelength of 980 nm, the transmission layer 110 may have a thickness P1 of 1.5 mm or less in the direction through which the laser beam is transmitted. In more detail, the transmission layer 110 may have a thickness P1 of 0.5 mm or more and 1.0 mm or less.

The reason is that the laser transmittance (of 20% or more) suitable for the laser welding may be secured even when the laser beam is reflected from the glass fiber in the case where the thickness of the transmission layer 110 included in PPS GF30 is 1.5 mm or less. In addition, in a case of applying the laser welding structure according to an embodiment of the present disclosure to a part such as a fuel pump, a water pump, or an oil pump, the thickness P1 of the transmission layer 110 may be 0.5 mm or more to secure a strength of the part to prevent a crack from occurring in the part even when receiving an internal pressure of about 2 to 3 bar or when dropped by 50 cm.

In addition, the thickness described above is an appropriate thickness for the transmission layer 110 which is made of the PPS material having the glass fiber content of 30% to 40%. Therefore, the thickness of the transmission layer 110 may be adjusted when PPS includes more or less glass fiber than that in the above range.

In another embodiment, the transmission layer 110 may have a thickness enabling the laser beam transmittance of 20% or more. Here, the laser diode wavelength may be 980 nm. Therefore, the laser welding is possible when the PPS material secures the laser beam transmittance of 20% or more regardless of its glass fiber content. Therefore, the thickness of the transmission layer 110 may be adjusted based on the glass fiber content. In addition, the thickness of the transmission layer 110 may be adjusted based on an intensity of the laser diode wavelength. That is, the PPS material may require a greater thickness when the laser diode wavelength has a higher intensity, and require a smaller thickness when the laser diode wavelength has a lower intensity.

Table 3 shows an internal pressure burst test result based on an amount of welding (or melted amount) of the PPS material. That is, Table 3 shows a pressure burst based on the amount of welding when an internal pressure is applied to the PPS material.

TABLE 3

| Amount of welding | 0.05 mm | 0.08 mm | 0.15 mm | 0.2 mm |
|---|---|---|---|---|
| Internal pressure at burst | 4 Bar | 7.3 Bar | 12 Bar | 10 Bar |

The amount of welding may be increased in proportion to an exposure time to the laser beam and in inverse proportion to the thickness of the transmission layer. Here, as shown in Table 3, it may be seen that the larger the amount of welding, the higher the internal pressure at burst. The amount of welding suitable for general laser welding may be between 0.05 and 0.2 mm, and in the case of applying the laser welding structure according to an embodiment of the present disclosure to the part such as a fuel pump, a water pump, or an oil pump, the amount of welding suitable for the laser welding according to the present disclosure may be 0.05 mm or more to secure the strength of the part to prevent the crack from occurring in the part when receiving the internal pressure of about 2 to 3 bar or more.

Based on the above experimental result, the transmission layer 110 according to an embodiment of the present disclosure may have a thickness of 0.05 mm or more as its amount of welding by the laser welding.

Figure 2A:
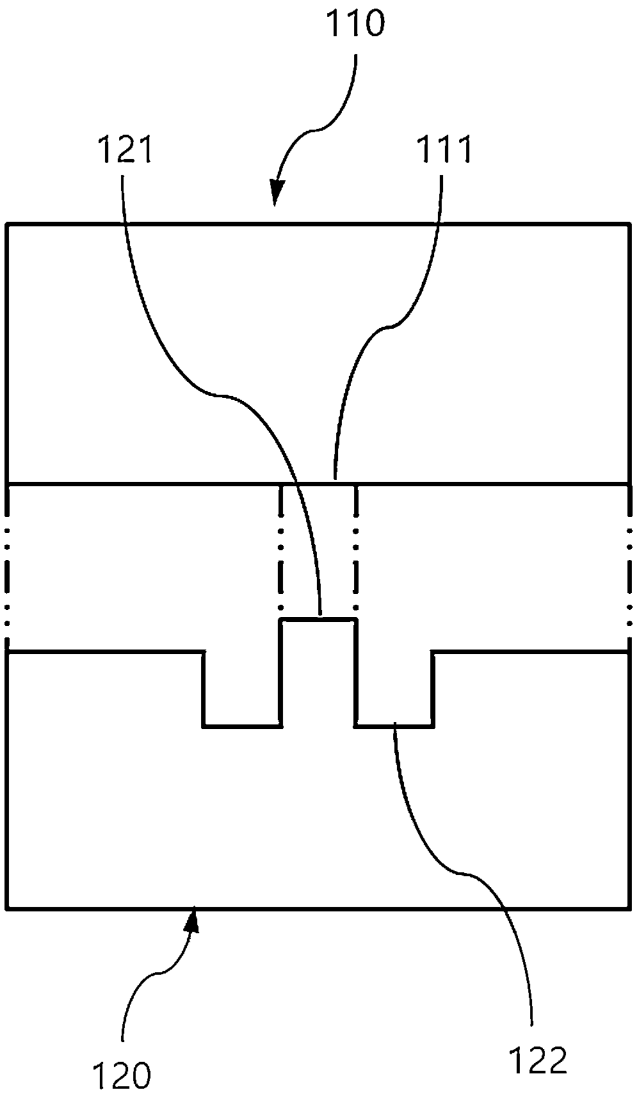
FIGS. 2A and 2B are schematic diagrams of a laser welding part before and after welding is performed thereon according to an embodiment of the present disclosure.
Figure 2B:
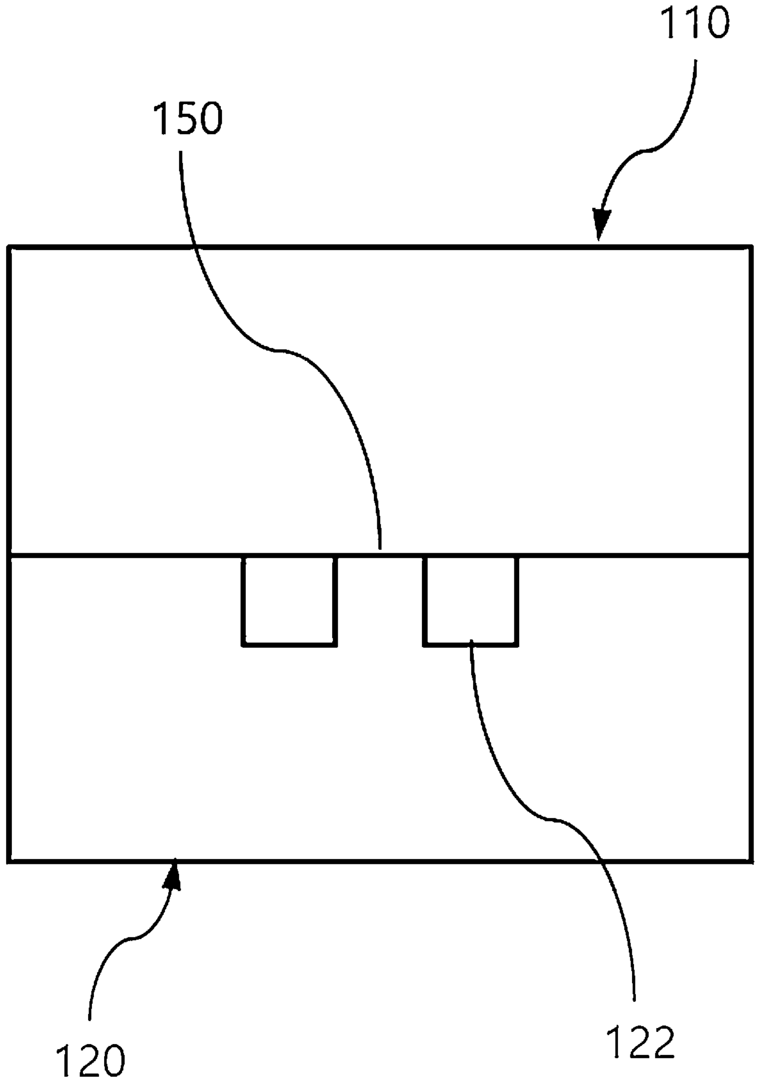

Referring to FIG. 2A, a welding surface 111 may be formed on a lower end of the transmission layer 110, and a weld mound 121 to be welded in contact with the welding surface 111 may be formed on an upper end of the non-transmission layer 120. The weld mound 121 may protrude upward from the upper end of the non-transmission layer 120, may be melted and solidified in contact with the welding surface 111 when irradiated with the laser. As shown in FIG. 2B, the weld mound 121 may here form a welded part 150 to thus laser weld the transmission layer 110 and the non-transmission layer 120 to each other.

In addition, a welding groove 122 may be disposed outside the weld mound 121 in a width direction. The welding groove 122 may be recessed downward from the upper end of the non-transmission layer 120, and accommodate a portion of the weld mound 121 melted during the welding and flowing down.

The configuration of the welded portion as described above may be applied to another embodiment below.

Second Embodiment (Protruding Type)

Figure 3:
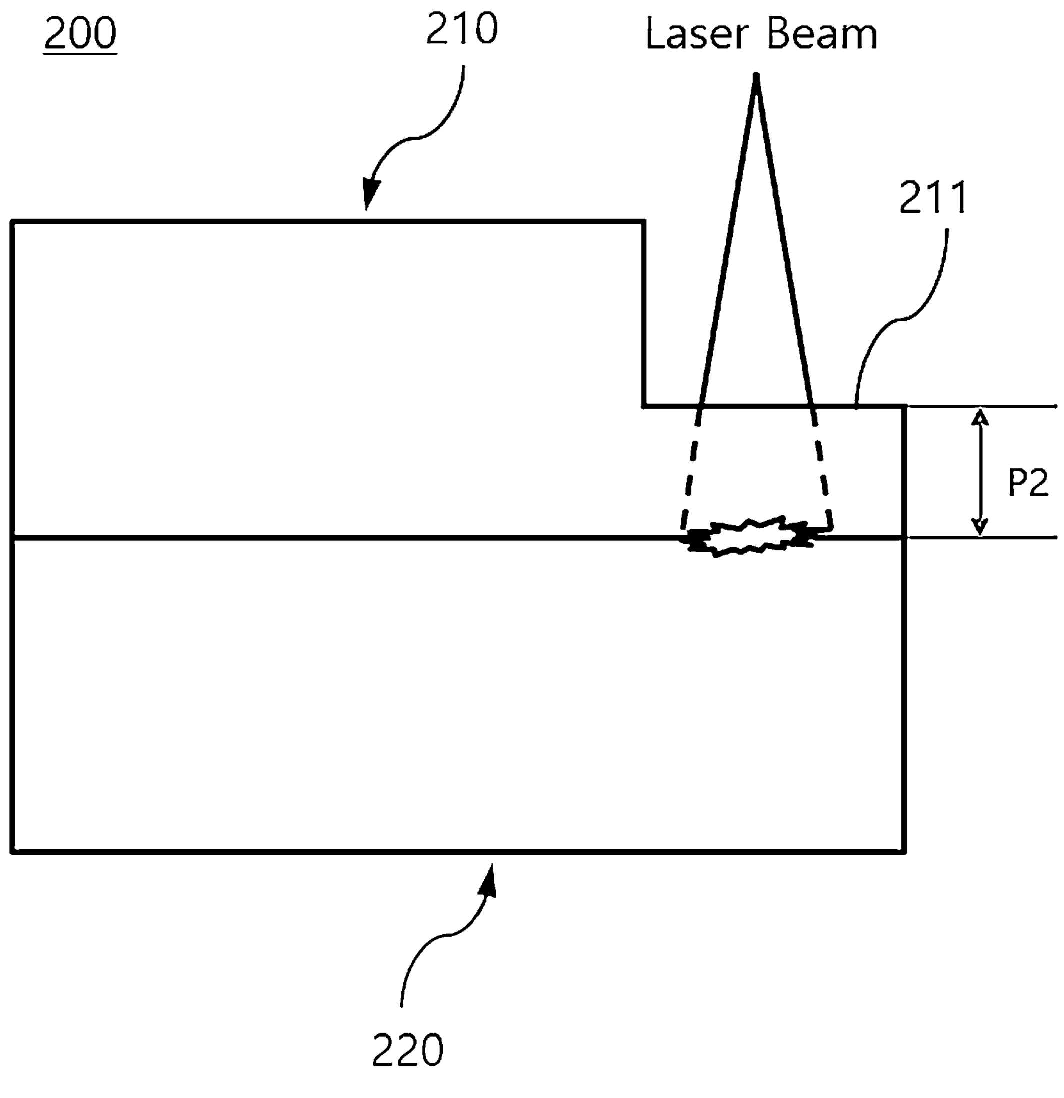
FIG. 3 is a schematic diagram of a laser welding structure according to a second embodiment of the present disclosure.

FIG. 3 is a schematic diagram of a laser welding structure 200 according to the second embodiment of the present disclosure. The laser welding structure 200 according to the second embodiment of the present disclosure may include a transmission layer 210 made of a polyphenylene sulfide (PPS) material including a glass fiber, and a non-transmission layer 220 made of the PPS material including the glass fiber. The PPS material including the glass fiber may be, for example, PPS GF40. In addition, the transmission layer 210 may have a color through which a laser beam is transmitted, and the non-transmission layer 220 may have a color through which no laser beam is transmitted. For example, the transmission layer 210 may have a white color, and the non-transmission layer 220 may have a black color.

Here, in a case of having a thickness of more than 1.5 mm, that is, having the laser beam transmittance of less than 20%, the transmission layer 210 may further include a welding transmission layer 211 having a thickness P2 of 1.5 mm or less in a direction through which the laser beam is transmitted. The welding transmission layer 211 may protrude outward from a side of the transmission layer 210, and have the other surface in contact with one surface of the non-transmission layer 220 and one surface thinner than the transmission layer 210. In addition, the welding transmission layer 211 may have a thickness P2 of 0.5 mm or more to secure its strength.

Accordingly, a laser transmittance suitable for laser welding may be secured even when the laser beam is reflected from the glass fiber in the case where the welding transmission layer 211 has a thickness of 1.5 mm or less.

In another example, the welding transmission layer 211 may have a thickness smaller than that of the transmission layer 210, the thickness securing the laser beam transmittance of 20% or more.

Third Embodiment (Protruding Symmetrical Type)

Figure 4:
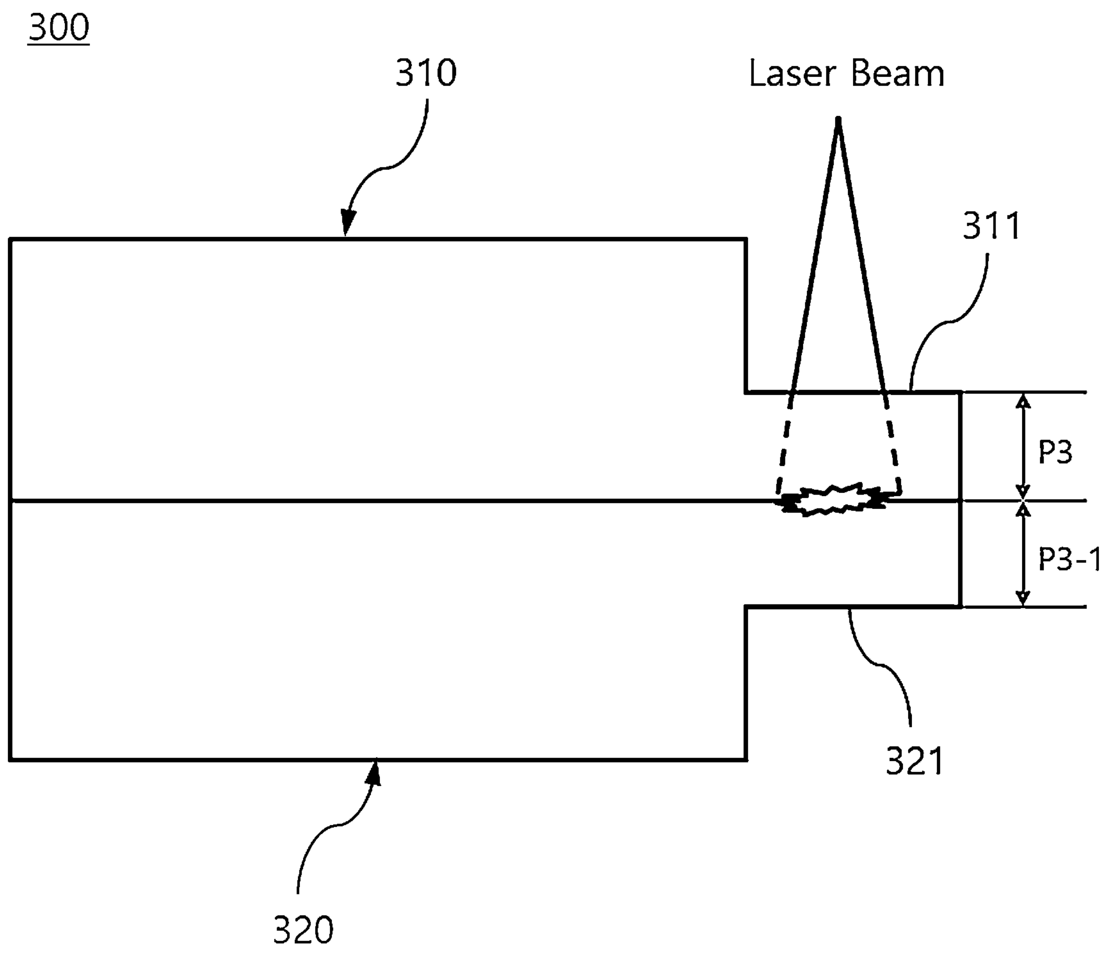
FIG. 4 is a schematic diagram of a laser welding structure according to a third embodiment of the present disclosure.

FIG. 4 is a schematic diagram of a laser welding structure 300 according to the third embodiment of the present disclosure. The laser welding structure 300 according to the third embodiment of the present disclosure may include a transmission layer 310 made of a polyphenylene sulfide (PPS) material including a glass fiber, and a non-transmission layer 320 made of the PPS material including the glass fiber. The PPS material including the glass fiber may be, for example, PPS GF40. In addition, the transmission layer 310 may have a color through which a laser beam is transmitted, and the non-transmission layer 320 may have a color through which no laser beam is transmitted. For example, the transmission layer 310 may have a white color, and the non-transmission layer 320 may have a black color.

Here, in a case of having a thickness of more than 1.5 mm, that is, having the laser beam transmittance of less than 20%, the transmission layer 310 may further include a welding transmission layer 311 having a thickness P3 of 1.5 mm or less in a direction through which the laser beam is transmitted. The welding transmission layer 211 may protrude outward from a side of the transmission layer 310. In addition, the welding transmission layer 311 may have a thickness P3 of 0.5 mm or more to secure its strength.

In addition, the non-transmission layer 320 may further include a welding layer 321 in contact with the welding transmission layer 311 when coupled to the transmission layer 310. The welding layer 321 may protrude outward from the side of the non-transmission layer 320. The welding layer 321 may have a thickness (P3-1) sufficient for the welding groove 122 described above to be formed. That is, the welding layer 321 may have a thickness (P3-1) which is greater than a depth of the welding groove 122.

Therefore, the welding transmission layer 311 may have the other surface in contact with one surface of the welding layer 321. In addition, the welding layer 321 may have a thickness P3-1 of 0.5 mm or more to secure its strength.

Accordingly, a laser transmittance suitable for laser welding may be secured even when the laser beam is reflected from the glass fiber in the case where the welding transmission layer 311 has a thickness of 1.5 mm or less.

In another example, the welding transmission layer 311 may have a thickness smaller than that of the transmission layer 310, the thickness securing the laser beam transmittance of 20% or more.

Fourth Embodiment (Inclined Type)

Figure 5:
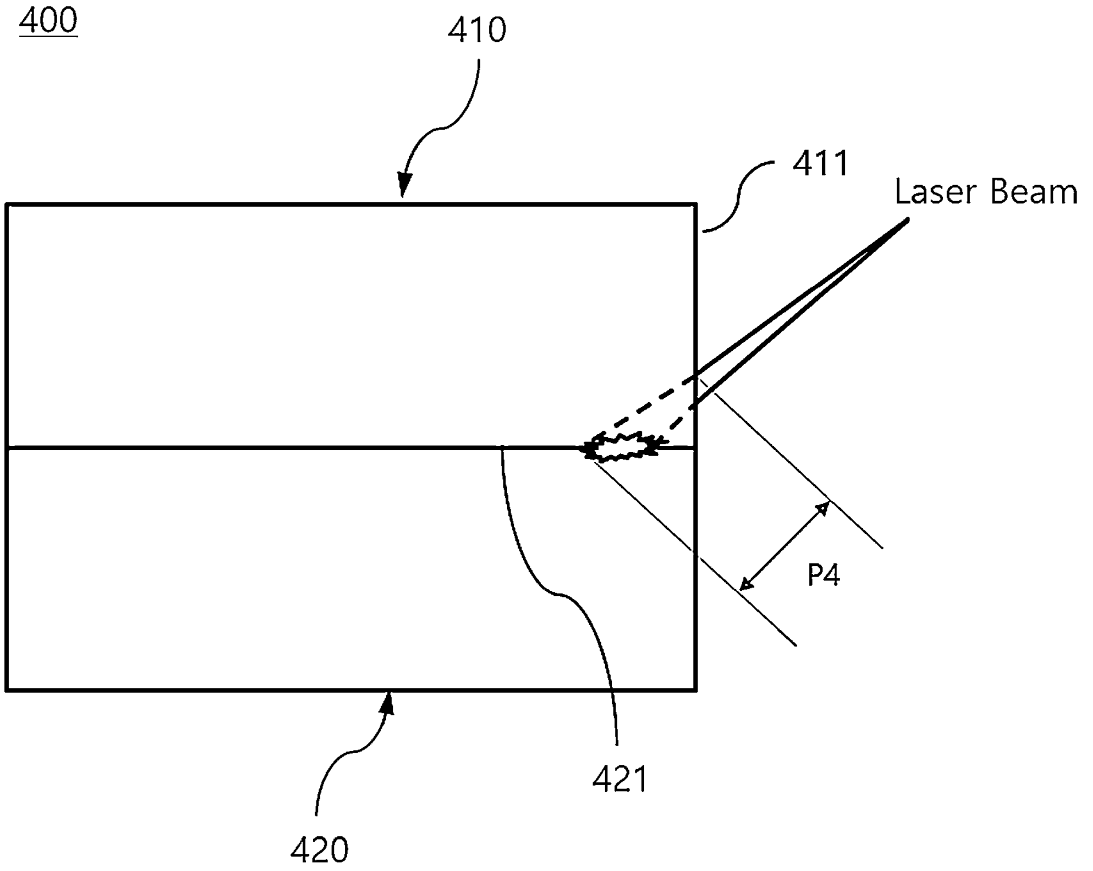
FIG. 5 is a schematic diagram of a laser welding structure according to a fourth embodiment of the present disclosure.

FIG. 5 is a schematic diagram of a laser welding structure 400 according to the fourth embodiment of the present disclosure. The laser welding structure 400 according to the fourth embodiment of the present disclosure may include a transmission layer 410 made of a polyphenylene sulfide (PPS) material including a glass fiber, and a non-transmission layer 420 made of the PPS material including the glass fiber. The PPS material including the glass fiber may be, for example, PPS GF40. In addition, the transmission layer 410 may have a color through which a laser beam is transmitted, and the non-transmission layer 420 may have a color through which no laser beam is transmitted. For example, the transmission layer 410 may have a white color, and the non-transmission layer 420 may have a black color.

Here, in a case where the transmission layer 410 has a thickness of more than 1.5 mm, that is, has the laser beam transmittance of less than 20%, and it is impossible to form the welding transmission layer as in the second or third embodiment described above, the laser welding structure 400 of this embodiment may enable laser welding by the following configuration.

A laser beam for the laser welding may be radiated to a welding surface 421, which is one surface of the non-transmission layer 420, through a side 411 of the transmission layer 410. Here, the transmission layer 410 transmitted through the laser beam may have a thickness P4 of 1.5 mm or less. That is, the transmission layer 410 having a thickness of more than 1.5 mm may be irradiated with the laser beam having an angle of less than 90 degrees through the side 411 of the transmission layer 410 instead of being irradiated with the laser beam perpendicular to the welding surface 421 of the non-transmission layer 420. In this way, the transmission layer 410 transmitted through the laser beam may be implemented to have a thickness P4 of 1.5 mm or less.

Accordingly, a laser transmittance suitable for the laser welding may be secured even when the laser beam is reflected from the glass fiber in the case where the welding transmission layer 410 through which the laser beam is transmitted has a thickness P4 of 1.5 mm or less.

In another example, the irradiation angle of the laser beam may be adjusted so that the thickness P4 of the transmission layer 410 through which the laser beam is transmitted is set to a thickness enabling the laser beam transmittance of 20% or more.

As set forth above, the laser welding structure for the thermosetting resin including the glass fiber according to the present disclosure, and the method using the same, configured as described above, may provide the improved welding structure by coupling the parts made of the glass fiber-reinforced PPS material to each other by the laser welding.

In addition, the present disclosure may secure the airtightness of the welded portion by improving its welding strength using the laser welding.

In addition, the present disclosure may prevent any appearance and quality defects by preventing the burr from occurring due to the welding.

In addition, the present disclosure may secure the improved welding quality by adjusting the amount of welding to thus form the parts coupled to each other to have the accurate dimensions through the welding.

The spirit of the present disclosure should not be limited to an embodiment described above. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

The invention claimed is:

1. A structure a wherein transmission layer made of a laser beam transmission material and a non-transmission layer made of a laser beam non-transmission material are coupled to each other by a laser welding, the structure comprising:

the transmission layer made of a resin material including the glass fiber, and having a first surface to which a laser beam is irradiated and a second surface opposite to the first surface; and the non-transmission layer made of the resin material including the glass fiber and having a first surface coupled to the second surface of the transmission layer and a second surface opposite to the first surface of the non-transmission layer, wherein each of the transmission layer and the non-transmission layer is made of polyphenylene sulfide (PPS), and has a glass fiber content of 30% or more, wherein the transmission layer includes a transmission path through which the laser beam is transmitted, wherein the transmission path through which a laser beam is transmitted has a thickness of 1.5 mm or less so that a transmittance of the laser beam transmitted through the transmission path is 20% or more, wherein the laser beam is transmitted through the transmission path and melts the first surface of the non-transmission layer to form a welded part between the transmission layer and non-transmission layer, and wherein the welded part has a melted depth of 0.05 mm to 0.2 mm, indicated as an amount welded by the laser beam.

2. The structure of claim 1, wherein the non-transmission layer includes a weld mound protruding from the first surface of the non-transmission layer toward the second surface of the transmission layer to be melted by the laser beam and welded to the second surface of the transmission layer.

3. The structure of claim 2, wherein when a main body portion of the transmission layer has a maximum thickness of more than 1.5 mm, the transmission layer includes a welding transmission layer protruding radially outward from a side of the main body portion, the welding transmission layer has a surface in contact with the first surface of the non-transmission layer, the laser beam welds the transmission layer and the non-transmission layer to each other through the welding transmission layer, and the welding transmission layer forming at least a part of the transmission path has a thickness of 1.5 mm or less.

4. The structure of claim 3, wherein the non-transmission layer includes a welding groove disposed outside the weld mound in a width direction and recessed from the first surface of the non-transmission layer toward the second surface of the non-transmission layer, and a welding layer protruding radially outward from a side of the non-transmission layer, and in contact with a surface of the welding transmission layer, the weld mound and the welding groove are formed at the welding layer, and the welding layer has a thickness greater than a depth of the welding groove.

5. The structure of claim 1, wherein the transmission path through which the laser beam is transmitted has a thickness of 0.5 mm or more.

6. The structure of claim 1, wherein when a main body portion of the transmission layer has a maximum thickness of more than 1.5 mm, the laser beam is radiated to a welding surface, which is the first surface of the non-transmission layer, through a side of the transmission layer so that the transmission path through which the laser beam is transmitted has a thickness of 1.5 mm or less.

7. The structure of claim 1, wherein the transmission path through which the laser beam is transmitted has a thickness of 1.5 mm or less based on a laser diode wavelength of 900 to 1100 nm, the transmission path has a smaller thickness when the diode wavelength is larger than the wavelength of 900 to 1100 nm, and the transmission path has a greater thickness when the diode wavelength is smaller than the wavelength of 900 to 1100 nm.

* * * * *